(12) United States Patent
Yokota et al.

(10) Patent No.: US 6,646,053 B2
(45) Date of Patent: Nov. 11, 2003

(54) GOLF BALL

(75) Inventors: Masatoshi Yokota, Kobe (JP); Hiroyuki Kishimoto, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/948,682

(22) Filed: Sep. 10, 2001

(65) Prior Publication Data

US 2002/0065148 A1 May 30, 2002

(30) Foreign Application Priority Data

| Sep. 18, 2000 | (JP) | ........................ 2000-281468 |
| Dec. 26, 2000 | (JP) | ........................ 2000-395398 |
| Dec. 28, 2000 | (JP) | ........................ 2000-401623 |

(51) Int. Cl.$^7$ .................. A63B 37/06; C08L 9/00
(52) U.S. Cl. .............. 525/193; 525/261; 525/274; 523/202; 473/371; 473/372; 473/373
(58) Field of Search ............ 523/202; 525/193, 525/261, 274; 473/371, 372, 373

(56) References Cited

U.S. PATENT DOCUMENTS

| 4,305,851 A | * | 12/1981 | Tominaga |
| 4,561,657 A | | 12/1985 | Tominaga et al. |
| 5,252,652 A | | 10/1993 | Egashira et al. |
| 6,136,906 A | | 10/2000 | Sano |
| 6,194,504 B1 | * | 2/2001 | Nagel |

FOREIGN PATENT DOCUMENTS

| JP | A6092781 | 5/1985 |
| JP | 63-222780 | 9/1988 |
| JP | A2297384 | 12/1990 |
| JP | A8196661 | 8/1996 |
| JP | A9122273 | 5/1997 |
| JP | A9235413 | 9/1997 |
| JP | A10244019 | 9/1998 |
| JP | A1157068 | 3/1999 |
| JP | A2000102627 | 4/2000 |

* cited by examiner

*Primary Examiner*—David J. Buttner
(74) *Attorney, Agent, or Firm*—Birch, Stewart, Kolasch & Birch, LLP

(57) ABSTRACT

The rubber composition for use in manufacturing a solid core of a multilayer-structured golf ball or a one-piece golf ball contains a co-curing agent and preferably an organic sulfur compound micro-encapsulated within a thermoplastic resin whose softening point is in a range of 80–250° C. This improves dispersibility of the co-curing agent and the organic sulfur compound within the rubber composition, and enables adjustment of a crosslinking pattern of rubber molecule main chains, so that rebound performance of the golf ball is improved.

9 Claims, No Drawings

GOLF BALL

BACKGROUND OF THE INVENTION

1. Field of the Invention

The present invention relates to a golf ball, in particular a solid golf ball excellent in homogeneity, and a manufacturing method thereof.

2. Description of the Background Art

Conventionally, a core of a golf ball or a one-piece golf ball has been manufactured by heating a rubber composition having a co-curing agent such as metallic salt of unsaturated carboxylic acid and a crosslinking initiator such as organic peroxide blended into a rubber component chiefly including polybutadiene, to crosslink rubber molecule main chains. As the metallic salt of unsaturated carboxylic acid, zinc acrylic acid has generally been used. When the rubber composition is heated, the crosslinking initiator such as dicumyl peroxide dissociates to generate a free radical, which is considered to attack the rubber molecule main chain or the co-curing agent to cause graft polymerization of the co-curing agent to the main chain of the rubber molecule or the crosslinking between the main chains. The state of dispersion of the co-curing agent such as metallic salt of unsaturated carboxylic acid within the rubber composition, and the speed of its crosslinking reaction to the main chain of the rubber molecule will considerably affect basic physical properties of the rubber composition after crosslinking, and will further affect properties of a multilayer-structured golf ball with its solid core formed of a vulcanizate of the rubber composition, or of a one-piece golf ball formed of the vulcanizate of the rubber composition.

Thus, in order to improve dispersibility of the co-curing agent within the rubber composition, a technique to coat a particle surface of the zinc acrylic acid with higher fatty acid or metallic salt of higher fatty acid has conventionally been proposed (U.S. Pat. No. 4,561,657 and Japanese Patent Laying-Open No. 60-92781).

Further, a technique to use, as the co-curing agent, metallic salt of unsaturated carboxylic acid having an average particle size of not greater than 5 μm, or unsaturated carboxylate having particle size distribution of 0.1–5 μm and an average particle size of 1–4.5 μm has also been proposed to improve the dispersibility of the co-curing agent within the rubber composition (Japanese Patent Laying-Open Nos. 8-196661, 9-235413, 11-57068, and U.S. Pat. No. 6,136,906).

These techniques are advantageous in that the dispersibility of the co-curing agent within the rubber composition is improved and thus hardness of the rubber composition is increased. However, due to the co-curing agent being so finely dispersed, the density of crosslinking between the rubber molecule main chains, which is most likely to contribute to rebound performance, is decreased, whereas the graft polymerization of the co-curing agent with the rubber molecule main chain, which is unlikely to contribute to the rebound performance, is increased, resulting in unsatisfactory rebound performance.

Proposed to improve such rebound performance is a technique to use an organic sulfur compound together with a metallic salt of α,β-unsaturated carboxylic acid (Japanese Patent Laying-Open Nos. 2-297384, 9-122273, 10-244019, 2000-102627, and U.S. Pat. No. 5,252,652). With this technique, however, the added organic sulfur compound captures the free radical of the crosslinking initiator, thereby limiting the activity of the crosslinking initiator. Thus, compared to the case where no organic sulfur compound is being added, the time of reaction is lengthened and a blended amount of crosslinking initiator should be increased. The basic characteristics of the rubber composition may also be impaired.

SUMMARY OF THE INVENTION

An object of the present invention is to improve dispersibility of a co-curing agent in a rubber composition for use in manufacturing a solid core of a golf ball or a one-piece golf ball, by micro-encapsulating the co-curing agent. Another object of the present invention is to provide a golf ball improved in rebound performance, by micro-encapsulating an organic sulfur compound together with the co-curing agent to properly restrict the speed of graft polymerization of the co-curing agent with a rubber molecule main chain and to give priority to crosslinking reaction between the rubber molecule main chains.

According to an aspect of the present invention, the golf ball includes a vulcanized molded product of a rubber composition containing a co-curing agent micro-encapsulated within a thermoplastic resin. Here, the thermoplastic resin preferably has a softening point in a range of 80–250° C. Further, the co-curing agent is preferably an α,β-unsaturated carboxylic acid and/or a metallic salt thereof.

The vulcanized molded product is either a one-piece golf ball or a solid core of a golf ball having a multi-layered structure.

According to another aspect of the present invention, the golf ball includes a vulcanized molded product of a rubber composition containing a co-curing agent and an organic sulfur compound micro-encapsulated within a thermoplastic resin. Here, the organic sulfur compound is preferably one of polysulfides, thiophenols and bivalent metallic salts of the thiophenols.

According to yet another aspect of the present invention, the manufacturing method of a golf ball including a vulcanized molded product of a rubber composition containing a co-curing agent micro-encapsulated within a thermoplastic resin includes:

(1) a step of blending the co-curing agent micro-encapsulated within the thermoplastic resin into the rubber composition, and (2) a step of heating the rubber composition to a temperature higher than the softening point of the thermoplastic resin for crosslinking.

The foregoing and other objects, features, aspects and advantages of the present invention will become more apparent from the following detailed description of the present invention.

DESCRIPTION OF THE PREFERRED EMBODIMENTS

In the case of a golf ball having a multi-layered structure such as a two-piece golf ball or a thread-wound golf ball, the golf ball according to the present invention is formed by covering a solid core with a thermoplastic resin, such as ionomer resin or trans 1,4-polyisoprene (TPI), as a cover material. A rubber composition of the solid core contains a microcapsule having a co-curing agent covered with a thermoplastic resin.

The co-curing agent for use in the present invention may be α,β-unsaturated carboxylic acid having a carbon number of 3–8 and/or metallic salt thereof. Examples of the α,β-unsaturated carboxylic acid include acrylic acid, methacrylic acid, maleic acid, fumaric acid and others. Among them, the acrylic acid is particularly suitable for the purpose of improving the rebound performance. Examples of the metallic salt include zinc salt, sodium salt, magnesium salt, calcium salt, aluminum salt and others. Among them, zinc salt is particularly preferable. Although zinc acrylic acid is suitably used as the co-curing agent, two or more types selected from the foregoing can be used together.

In the present invention, it is preferable to encapsulate an organic sulfur compound together with the co-curing agent within the thermoplastic resin. Herein, the organic sulfur compound is a concept including a metal-containing organic sulfur compound. As the organic sulfur compound, thiophenols such as pentachloro thiophenol, 4-t-butyl thiophenol and 2-benzamide thiophenol, thio carboxylic acids such as thio benzoic acid, and sulfides such as monosulfide, disulfide and polysulfide may be used. As the metal-containing organic sulfur compound, zinc salt, magnesium salt and sodium salt of thiophenols or thio carboxylic acids may be used. The monosulfide is, e.g., diphenyl monosulfide, and the disulfide is, e.g., diphenyl disulfide. The polysulfide is, e.g., diphenyl polysulfide, including dibenzyl polysulfide, dibenzoyl polysulfide, dibenzothiazoyl polysulfide, and dithiobenzoyl polysulfide. As such sulfides, those including various types of substituent groups, such as methyl group, ethyl group, amino group, hydroxyl group and others, in the phenyl group may also be used.

The thermoplastic resin for use as a film material of the microcapsule has a softening point in a range of 80–250° C., preferably in a range of 100–200° C., and more preferably in a range of 120–160° C. If the softening point is lower than 80° C., the microcapsule may break during kneading of the rubber composition. If it exceeds 250° C., however, the thermoplastic resin as the film material of the microcapsule may not melt at a temperature (hereinafter, "crosslinking temperature") at which crosslinking of the rubber composition normally takes place, hindering release of the co-curing agent and the organic sulfur compound from the microcapsule. Accordingly, the type of the thermoplastic resin is preferably determined taking into account a relation between its softening point and the crosslinking temperature of the rubber composition.

Examples of the thermoplastic resin for use as the film material of the microcapsule in the present invention are polystyrene, polyethylene, polypropylene, polyurethane, nylon resin, acrylic resin, methacrylic resin, ethylene-acrylic acid copolymer, ethylene-vinyl acetate copolymer, vinyl chloride resin, butadiene resin, butene resin, polycarbonate, ABS resin, and AS resin. When chlorine resin such as vinyl chloride resin is to be used, one soluble in an organic solvent and having a softening point close to an intended temperature will be suitable.

As a method of micro-encapsulating the co-curing agent alone or the co-curing agent and the organic sulfur compound within the thermoplastic resin, any of the known methods for micro-encapsulation can be employed. One of such methods suitably used is an evaporation process in solvent. This process uses water or oil as a medium for encapsulation, in which a solution of a film material containing a core material is dispersed in the form of drops, and the solvent is eliminated to form a hard capsule film. Specifically, a solvent having a boiling point lower than that of water and a vapor pressure greater than that of water and not dissoluble with water is first selected, and a polymer of the film material is dissolved therein. In this solution, a water solution of the core material is dispersed to form a (W/O) type emulsion. Another water solution including protective colloid is prepared as the medium for encapsulation, to which the foregoing emulsion is dispersed while stirring, so that a [(W/O)/W] type complex emulsion is generated. In this system, drops of the water solution enveloped with the polymer solution are floating in the water. As the system undergoes processes of warming, decompression, solvent extraction and others, the solvent of the polymer is dried, and thus, a hard film of the polymer, or the microcapsule, is formed.

Another suitable method is an air-suspension technique. In this technique, a core material (powder) is fluidized by an airflow and suspended in the air, and an emulsion with a thermoplastic resin as the film material emulsified therein is sprayed onto the surface of the suspended powder. The air is then heated to vaporize the medium, so that the capsule film is formed. Yet another method suitably used is a spray dry method, wherein a core material is suspended in an emulsion with a thermoplastic resin as the film material emulsified therein, and the suspension is sprayed to form fine particles. The fine particles are instantaneously dried, and thus, the capsule film is formed. The encapsulation method used in the present invention is not limited to any specific one. Other methods, such as a method of encapsulating powder particles under a dry condition (by mixing particles of a core material and finer particles of a film material and applying impact by centrifugal force, for example, to fill the film material in the surface of the core material), may also be employed.

The microcapsule obtained in the above-described manner preferably contains 70–95 wt. % of the co-curing agent. If it is less than 70 wt. %, release of the co-curing agent will be insufficient. If it exceeds 95 wt. %, manufacture of homogeneous microcapsules will become difficult. The blended amount of the micro-encapsulated co-curing agent in the rubber composition of the solid core, in terms of co-curing agent, is 10–70 parts by weight and more preferably 15–40 parts by weight with respect to 100 parts by weight of the rubber component. If it is less than 10 parts by weight, crosslinking density of a sufficient level cannot be obtained. If it exceeds 70 parts by weight, in addition to an increase in hardness, graft polymerization of the co-curing agent with the rubber molecule main chain will occur, which is disadvantageous from the standpoint of rebound performance.

The microcapsule preferably contains 0.5–10 wt. % of the organic sulfur compound. If it is less than 0.5 wt. %, the effect of blending the organic sulfur compound will be insufficient. If it exceeds 10 wt. %, physical properties of the rubber composition will be degraded. The blended amount of the micro-encapsulated organic sulfur compound to the rubber composition of the solid core, in terms of the organic sulfur compound, is preferably 0.05–5.0 parts by weight, more preferably 0.1–3.0 parts by weight, and still more preferably 0.3–1.5 parts by weight with respect to 100 parts by weight of the rubber component.

The S—S bond or C—S bond of the organic sulfur compound tends to dissociate when heated and generate free radicals, which would act on the rubber molecule main chain as well as the co-curing agent, thereby affecting the crosslinking pattern. When the blended amount of the organic sulfur compound is less than 0.05 parts by weight, the effect of blending the same is not enjoyed. If it exceeds 5.0 parts by weight, the crosslinking density decreases. In this case, soft touch cannot be obtained, and rebound performance is also insufficient.

When micro-encapsulating the co-curing agent and the organic sulfur compound together, the organic sulfur compound is preferably contained 0.3–10 wt. %, and more preferably 0.3–7 wt. %, with respect to the co-curing agent within the microcapsule.

The rubber composition of the present invention contains, besides the micro-encapsulated co-curing agent, a rubber component, an organic peroxide, a filler and others. As the rubber component, diene type rubber of either natural rubber or synthetic rubber may be used. In particular, high cis polybutadiene rubber having a cis-1, 4 bond content of preferably at least 40%, more preferably at least 70%, and still more preferably at least 90%, is preferred. It is also possible to blend natural rubber (NR), polyisoprene rubber (IR), styrene-butadiene rubber (SBR), ethylene-propylene-diene terpolymer (EPDM) or other types of diene type rubber in the high cis polybutadiene rubber above, where appropriate.

The organic peroxide is blended primarily as a crosslinking initiator to form crosslinks between the rubber molecule main chains. Since the crosslinking pattern by virtue of the organic peroxide primarily contributes to rebound performance, the blended amount of the organic peroxide is determined taking into consideration a desired property of the solid core. Examples of the organic peroxide include dicumyl peroxide, 1,1-bis (t-butyl peroxy)-3,3,5-trimethyl cyclohexane, 2,5-dimethyl-2,5-di (t-butyl peroxy) hexane, di-t-butyl peroxide and others. Among them, dicumyl peroxide is particularly preferable. The organic peroxide is blended 0.1–5.0 parts by weight, and more preferably 0.3–3.0 parts by weight, with respect to 100 parts by weight of the rubber component. If it is less than 0.1 parts by weight, the crosslinking density is low, so that hardness and rebound performance are insufficient. If it exceeds 5.0 parts by weight, however, the crosslinking density increases, and the hardness becomes too high.

Examples of the filler include metallic powders of high specific gravity, such as tungsten powder, molybdenum powder, and metallic salts of zinc oxide, barium sulfate and calcium carbonate, which are primarily used for adjustment of specific gravity. An antioxidant and others may also be added where appropriate.

The outside diameter of the solid core of the multilayer-structured golf ball is set preferably in a range of 30–42 mm, and more preferably in a range of 32–40 mm. If the outside diameter of the solid core is smaller than 30 mm, the thickness of the cover becomes relatively thick, which tends to cause degradation of rebound performance. If the outside diameter is greater than 42 mm, the cover becomes thin, which makes molding of the golf ball difficult, and also degrades durability of the ball.

The solid core is configured such that the amount of deformation by compression under loads from an initial load of 98 N to a final load of 1275 N falls in a range of 2.5–5.0 mm, and more preferably in a range of 2.8–4.5 mm. If it is less than 2.5 mm, hardness increases, resulting in unfavorable hit feeling. If it exceeds 5.0 mm, it becomes too soft.

In the present invention, the solid core refers not only to a simple solid core but also to a thread-wound core obtained by winding a rubber thread around a simple solid core. Further, the solid core may have either a single-layer structure or a multilayer structure made of two or more layers.

The volume of the solid core, in which the microcapsules are blended according to the present invention, with respect to the total volume of the golf ball is preferably in a range of 30–90% and more preferably in a range of 60–85%. If it is less than 30%, the effect of the present invention cannot be obtained sufficiently. If it exceeds 90%, the cover becomes relatively thin, so that durability of the golf ball is deteriorated.

Crosslinking reaction of the rubber composition described above is conducted, e.g., at a temperature of 120–230° C. for 10–50 minutes, preferably at 130–200° C. for 10–40 minutes, and more preferably at 140–180° C. for 10–40 minutes. A relation between the heating temperature (A) and the softening point (B) of the thermoplastic resin as a film material of the microcapsule is set such that (A–B) falls preferably in a range of 10–100° C., more preferably in a range of 20–90° C., and still more preferably in a range of 30–80° C.

If (A–B) is less than 10° C., release of the co-curing agent and the organic sulfur compound from the microcapsules becomes slow, which lengthens the time required for crosslinking, thereby degrading productivity. If (A–B) exceeds 100° C., the microcapsules may break during kneading of the rubber composition, in which case the effect of the present invention cannot be achieved.

Specifically, if the crosslinking reaction is expected at a temperature from 140° C. to 170° C., it is preferred to employ thermoplastic resin such as polystyrene or polyethylene whose softening point is approximately 100–120° C. Since the crosslinking reaction is exothermic, the crosslinking temperature becomes higher than the temperature to which the mold is heated. Therefore, it is preferred to control the crosslinking temperature according to the actual measurement inside the solid core.

If the rubber composition is kept at a temperature below the softening point of the thermoplastic resin, graft polymerization of the co-curing agent will not occur within the rubber composition. In such a case, the necessity of adjusting the time from kneading to molding is lessened.

The softening point of the thermoplastic resin is measured using an analytical device TMA as follows. A measuring stylus under a load is rested on a sample of the thermoplastic resin in a plate form. The sample is heated at a prescribed rate of 5° C./min, for example, and the temperature at which the measuring stylus penetrates into the sample is obtained.

The multilayer-structured golf ball of the present invention is formed by covering the above-described solid core with a cover. As the cover composition, trans 1,4-polyisoprene, ionomer resin, polyethylene resin, polypropylene resin, polyester type thermoplastic elastomer, polyamide type thermoplastic elastomer, polyurethane type thermoplastic elastomer, polystyrene type thermoplastic elastomer or the like may be used alone or by mixing together.

Herein, the trans 1,4-polyisoprene refers to one having a trans content of at least 60% in the polyisoprene molecule. One having a trans content of less than 60% has a low degree of crystallinity and thus the softening point thereof is too low. It cannot satisfy the basic characteristics as a cover.

Examples of the ionomer resin include: a copolymer of $\alpha$-olefin and $\alpha,\beta$-unsaturated carboxylic acid with a carbon number of 3–8, having at least a portion of carboxyl group therein neutralized by a metal ion; and a terpolymer of $\alpha$-olefin, $\alpha,\beta$-unsaturated carboxylic acid with a carbon number of 3–8 and $\alpha,\beta$-unsaturated carboxylate with a carbon number of 2–22, having at least a portion of carboxyl group therein neutralized by a metal ion. As the $\alpha$-olefin above, ethylene, propylene, 1-butene, 1-pentene or the like may be used. Among them, ethylene is preferable in particular. As the $\alpha,\beta$-unsaturated carboxylic acid with a carbon number of 3–8, acrylic acid, methacrylic acid, fumaric acid, maleic acid, crotonic acid or the like may be used. Among them, acrylic acid and methacrylic acid are particularly preferable. As the $\alpha,\beta$-unsaturated carboxylate with a carbon number of 2–22, methyl, ethyl, propyl, n-butyl, isobutyl ester or the like of acrylic acid, methacrylic acid, fumaric acid, maleic acid or the like may be used. Among them, acrylate and methacrylate are particularly preferable.

For neutralization of at least a portion of the carboxyl group within the binary copolymer of $\alpha$-olefin and $\alpha,\beta$-unsaturated carboxylic acid having a carbon number of 3–8 or the terpolymer of $\alpha$-olefin, $\alpha,\beta$-unsaturated carboxylic acid having a carbon number of 3–8 and $\alpha,\beta$-unsaturated carboxylate having a carbon number of 2–22 described above, sodium ion, lithium ion, zinc ion, magnesium ion, potassium ion or the like may be used.

In the cover composition of the present invention, from the standpoint of improving durability and rebound performance, a polymer component chiefly containing thermoplastic resin and/or thermoplastic elastomer is preferably used. In particular, the durability and the rebound performance will be further improved if the ionomer resin is included 50 wt. %, and more preferably 70 wt. %, within the polymer component.

The thickness of the cover is preferably in a range of 0.35–6.35 mm, more preferably in a range of 0.7–5.35 mm, and still more preferably in a range of 1.0–4.0 mm. If it is less than 0.35 mm, strength and durability of the cover are degraded. If it exceeds 6.35 mm, a volume percent of the cover composition in the entire ball becomes large, thereby degrading rebound performance of the ball.

In the cover described above, fiber-reinforced rubber, fiber-reinforced resin, inorganic single-crystal component, specific gravity adjusting agent, metallic powder, metal oxide, pigment, colorant, fluorescent brightening agent, lubricant, UV absorbent, photo-stabilizer, antioxidant and others may also be blended where appropriate.

The golf ball of the present invention is manufactured as follows. The cover composition is first kneaded with a roll or a kneader. To envelop the solid core with the cover composition, the cover composition may be preformed into half shells. In this case, the solid core is enveloped with two such half shells and press-molded at 130–170° C. for 1–5 minutes. Alternatively, the cover composition may be injection-molded directly on the solid core to envelop the core.

The rubber composition of the present invention can also be used to form a one-piece golf ball. In this case, the rubber composition having the co-curing agent and possibly the organic sulfur compound as needed microencapsulated and blended therein is kneaded with a roll or a kneader. The rubber composition is then subjected to thermoforming in a mold, so that the one-piece golf ball is obtained.

The one-piece golf ball as a vulcanizate of the rubber composition of the present invention is adjusted such that the amount of deformation by compression under loads from an initial load of 98 N to a final load of 1275 N falls in a range of 1.0–5.0 mm, and preferably in a range of 2.0–4.0 mm. If it is less than 1.0 mm, hardness increases, resulting in unfavorable hit feeling. If it exceeds 5.0 mm, the ball becomes too soft.

EXAMPLES

Examples 1–4 and Comparative Example 1
(1) Manufacture of Microcapsules
(A) Microcapsule A 5 g of polystyrene (softening point: 100° C.) was dissolved into 50 ml of methylene chloride, to which a water solution of zinc acrylic acid as a co-curing agent was added in an amount of 100 g (concentration: 20%), and stirred for 30 minutes for emulsification. A (W/O) type emulsion was obtained. Next, 1 liter of 4% PVA water solution was prepared, to which the (W/O) type emulsion above was added while stirring, so that a [(W/O)/W)] type complex emulsion was obtained. The system was gradually heated to 40° C. to vaporize the methylene chloride. Thereafter, the system was stirred at 55° C. for an hour to harden the film material, so that microcapsule A was obtained. Zinc acrylic acid is included 78 wt. % within the microcapsule.

(B) Microcapsule B

Microcapsule B was manufactured in the same manner as microcapsule A, except that polypropylene (softening point: 120° C.) was used as a film material. Zinc acrylic acid is included 75 wt. % within the microcapsule.

(C) Microcapsule C

Microcapsule C was manufactured again in the same manner as microcapsule A, except that 8 g of polystyrene (softening point: 100° C.) was dissolved into 50 ml of methylene chloride. Zinc acrylic acid is included 70 wt. % within the microcapsule.

(2) Production of Solid Core

The respective rubber composition shown in Table 1 was kneaded using a kneader and roll, and subjected to hot pressing at 160° C. for 30 minutes. A solid core having an outside diameter of 38.4 mm and a weight of 34.6 g was produced. The temperature at the time of kneading was controlled such that the temperature of the rubber composition would not exceed 100° C. The amount of deformation (mm) by compression of the solid core under loads from an initial load of 98 N to a final load of 1275 N is shown in Table 1.

(3) Manufacture of Golf Ball with Cover

The respective cover composition shown in Table 1 was injection-molded on the solid core to form a cover with a thickness of 2.3 mm. Clear paint made of urethane was then applied thereon.

The obtained golf ball was 42.7 mm in diameter and 45.4 g in weight.

TABLE 1

| | Parts by weight | | Example 1 | Example 2 | Example 3 | Example 4 | Comparative example 1 |
|---|---|---|---|---|---|---|---|
| Core composition | Polybutadiene | *1) | 100 | 100 | 100 | 100 | 100 |
| | Type of microcapsule | *2) | A | B | A | C | — |
| | Blended amount | | 38.5 | 40 | 44.9 | 42.9 | |
| | (in terms of zinc acrylic acid) | | (30) | (30) | (35) | (30) | |
| | Zinc acrylic acid | *3) | — | — | — | — | 30 |
| | Zinc oxide | *4) | 20 | 20 | 20 | 20 | 20 |
| | Dicumyl peroxide | *5) | 0.8 | 0.8 | 0.8 | 0.8 | 0.8 |
| Cover composition | Hi-milan 1605 | *6) | 50 | 50 | 50 | 50 | 50 |
| | Hi-milan 1706 | *7) | 50 | 50 | 50 | 50 | 50 |
| | Titanium dioxide | *8) | 4 | 4 | 4 | 4 | 4 |

TABLE 1-continued

| Parts by weight | | Example 1 | Example 2 | Example 3 | Example 4 | Comparative example 1 |
|---|---|---|---|---|---|---|
| Physical property | Amount of deformation by compression (mm) | 3.38 | 3.40 | 2.56 | 3.41 | 3.14 |
| | Coefficient of restitution | 0.786 | 0.784 | 0.797 | 0.784 | 0.783 |

The core compositions and the cover compositions shown in Table 1 have polymer components and ingredients as follows.
*1) Polybutadiene, BR01, available from JSR Corporation, having a cis-1,4 bond content of 96%, was used.
*2) Three types of microcapsules A, B and C manufactured as described above were used for the Examples.
*3) Zinc acrylic acid, ZNDA-90S, available from Nippon Joryu Kogyo K.K. was used.
*4) Zinc oxide available from Toho Zinc Co., Ltd. was used.
*5) Dicumyl peroxide, Percumyl D, available from NOF Corporation was used.
*6) Hi-milan 1605, an ionomer neutralized with sodium, available from Du Pont-Mitsui Polychemical Co., Ltd. was used.
*7) Hi-milan 1706, an ionomer neutralized with zinc, available from Du Pont-Mitsui Polychemical Co., Ltd. was used.
*8) Titanium dioxide, A-220, available from Ishihara Sangyo Kaisha, Ltd. was used.

The physical properties of the obtained solid cores and golf balls were measured in the following manners. The measured results are shown in Table 1.

1) Amount of Deformation by Compression

The amount of deformation (mm) of the solid core under loads from an initial load of 98 N to a final load of 1275 N was measured.

2) Coefficient of Restitution

A cylindrical body made of aluminum weighing 198.4 g was struck out with an initial speed of 45 m/s to hit the golf ball. The restitution coefficient was calculated from the struck-out speed of the golf ball when hit.

It is appreciated from Table 1 that Examples 1–4 of the present invention are superior to Comparative example 1 in restitution coefficient, because Examples 1–4 each employ the rubber composition for the core having the micro-encapsulated co-curing agent blended therein, whereas Comparative example 1 employs the rubber composition containing no microcapsules.

According to the present invention, the co-curing agent being blended into the rubber composition for the solid core is encapsulated within the thermoplastic resin, so that the co-curing agent in the state of microcapsules can be dispersed uniformly in the rubber composition during kneading. When the rubber composition is heated for crosslinking, the microcapsules melt and release the co-curing agent sealed therein, which comes into contact with a crosslinking initiator, so that the crosslinking reaction is started. Since the co-curing agent starts reaction immediately after the microcapsule has melted, the co-curing agent as a lump of a certain volume performs the crosslinking reaction with the rubber molecule main chains.

Further, the reaction of the co-curing agent with the rubber molecule is restricted to some extent by the film material of the microcapsule. Thus, the number of bonding points between the co-curing agent and the rubber molecule can be reduced, so that a solid core that is soft and excellent in rebound performance can be obtained. The size of the particles can be made uniform by virtue of the microcapsules, so that a solid core homogeneous in physical properties can be obtained. In addition, the crosslinking initiator such as peroxide or the like promotes crosslinking of the rubber molecule main chains before the melting of the microcapsules. Accordingly, a crosslinking pattern advantageous in rebound performance can be achieved, so that rebound performance of the golf ball is improved.

Examples 5–9 and Comparative Example 2

(1) Manufacture of Microcapsules (i) Microcapsule D 5 g of polystyrene (softening point: 100° C.) was dissolved into 50 ml of methylene chloride, to which a water solution of zinc acrylic acid as the co-curing agent and diphenyl disulfide as the organic sulfur compound was added in an amount of 100 g (concentration of zinc acrylic acid: 20 wt. %, concentration of diphenyl disulfide: 0.3 wt. %). It was stirred for 30 minutes to obtain a (W/O) type emulsion. Next, 1 liter of 4 wt. % PVA water solution was prepared, to which the (W/O) type emulsion above was added while stirring, so that a [(W/O)/W)] type complex emulsion was obtained. The system was gradually heated to 40° C. to vaporize methylene chloride, followed by stirring at 55° C. for an hour to harden the film material. It was further heated to 60° C. under a reduced pressure of 0.1 atmosphere to eliminate the water within the capsule. Microcapsule D was thus obtained. Microcapsule D includes 78 wt. % of zinc acrylic acid and 1.2 wt. % of diphenyl disulfide.

(ii) Microcapsule E

Microcapsule E was manufactured under the same conditions as microcapsule D, except that diphenyl disulfide was not added thereto. The obtained microcapsule E includes 78 wt. % of zinc acrylic acid.

(iii) Microcapsule F

Microcapsule F was manufactured under the same conditions as microcapsule D, except for the concentration of diphenyl disulfide (namely, the concentration of diphenyl disulfide within the water solution was set to 0.1 wt. %). Microcapsule F includes 78 wt. % of zinc acrylic acid and 0.4 wt. % of diphenyl disulfide.

(iv) Microcapsule G

Microcapsule G was manufactured under the same conditions as microcapsule D, except again for the concentration of diphenyl disulfide (this time, the concentration of diphenyl disulfide within the water solution was set to 1.5 wt. %). Microcapsule G includes 78 wt. % of zinc acrylic acid and 6 wt. % of diphenyl disulfide.

(2) Production of Solid Core

The respective rubber composition shown in Table 2 was kneaded using a kneader and roll, and subjected to hot pressing at 160° C. for 30 minutes. A solid core having an outside diameter of 38.4 mm and a weight of 34.6 g was produced. The temperature at the time of kneading was controlled such that the temperature of the rubber composition would not exceed 100° C. The amount of deformation (mm) by compression of the solid core under loads from an initial load of 98 N to a final load of 1275 N is shown in Table 2.

(3) Manufacture of Golf Ball with Cover

The respective cover composition shown in Table 2 was injection-molded on the solid core to form a cover with a thickness of 2.3 mm. Clear paint made of urethane was then applied thereon.

The obtained golf ball was 42.7 mm in diameter and 45.4 g in weight.

TABLE 2

| Parts by weight | | | Example 5 | Example 6 | Example 7 | Example 8 | Comparative example 2 | Example 9 |
|---|---|---|---|---|---|---|---|---|
| Core composition | Polybutadiene | *1) | 100 | 100 | 100 | 100 | 100 | 100 |
| | Type of microcapsule | *2) | Microcapsule D | Microcapsule F | Microcapsule G | Microcapsule E | — | Microcapsule E |
| | Blended amount | | 38.5 | 38.5 | 38.5 | 38.5 | | 38.5 |
| | (in terms of zinc acrylic acid) | | (30.0) | (30.0) | (30.0) | (30.0) | | (30.0) |
| | (in terms of diphenyl disulfide) | | (0.5) | (0.2) | (2.3) | — | | — |
| | Zinc acrylic acid | *3) | — | — | — | — | 30 | — |
| | Zinc oxide | *4) | 20 | 20 | 20 | 20 | 20 | 20 |
| | Dicumyl peroxide | *5) | 0.8 | 0.8 | 0.8 | 0.8 | 0.8 | 0.8 |
| | Diphenyl disulfide | | — | — | — | — | — | 0.5 |
| | Time for vulcanization (min) | | 30 | 29 | 33 | 28 | 28 | 35 |
| Cover composition | Hi-milan 1605 | *6) | 50 | 50 | 50 | 50 | 50 | 50 |
| | Hi-milan 1706 | *7) | 50 | 50 | 50 | 50 | 50 | 50 |
| | Titanium dioxide | *8) | 4 | 4 | 4 | 4 | 4 | 4 |
| Physical Property | Amount of deformation by compression(mm) | | 3.05 | 3.02 | 3.15 | 2.98 | 2.94 | 3.00 |
| | Coefficient of restitution | | 0.790 | 0.788 | 0.783 | 0.786 | 0.780 | 0.787 |

The polymer components and ingredients within the respective core compositions and cover compositions shown in Table 2 are as follows.
*1) Polybutadiene, BR01, available from JSR Corporation, having a cis-1,4 bond content of 96%, was used.
*2) Microcapsules D, E, F and G manufactured as described above were used for the Examples.
*3) Zinc acrylic acid, ZNDA-90S, available from Nippon Joryu Kogyo K.K. was used.
*4) Zinc oxide available from Toho Zinc Co., Ltd. was used.
*5) Dicumyl peroxide, Percumyl D, available from NOF Corporation was used.
*6) Hi-milan 1605, an ionomer neutralized with sodium, available from Du Pont-Mitsui Polychemical Co., Ltd. was used.
*7) Hi-milan 1706, an ionomer neutralized with zinc, available from Du Pont-Mitsui Polychemical Co., Ltd. was used.
*8) Titanium dioxide, A-220, available from Ishihara Sangyo Kaisha, Ltd. was used.

The physical properties of the obtained solid cores and golf balls were measured as described above. The results are shown in Table 2.

The rubber composition employed in Example 8 has micro-encapsulated zinc acrylic acid blended therein, while diphenyl disulfide is not blended therein. The rubber composition of Comparative example 2 has non-encapsulated zinc acrylic acid blended therein. The rubber composition of Example 9 has micro-encapsulated zinc acrylic acid and non-encapsulated diphenyl disulfide blended therein.

It is appreciated that Examples 5–7 are superior to Comparative example 2 in restitution coefficient, because the rubber compositions used in Examples 5–7 each have zinc acrylic acid as the co-curing agent and diphenyl disulfide as the organic sulfur compound micro-encapsulated and blended therein.

According to the present invention, the co-curing agent and the organic sulfur compound being blended into the rubber composition for the solid core are encapsulated within the thermoplastic resin. Therefore, the co-curing agent and the organic sulfur compound in the state of microcapsules can be uniformly dispersed within the rubber composition when kneading. The microcapsules melt when the rubber composition is heated for crosslinking. The co-curing agent released therefrom comes into contact with a crosslinking initiator, so that the crosslinking reaction is started. The co-curing agent starts reaction immediately after the microcapsule has melted.

When the rubber composition is heated, in parallel with the melting of the microcapsules, the organic peroxide generates free radicals to form crosslinks between the rubber molecule main chains. Such crosslinking takes place in preference to the graft polymerization of the co-curing agent to the rubber molecule main chain, since the capturing of the free radicals by the organic sulfur compound is restricted.

Therefore, the density of crosslinks between the rubber molecule main chains becomes comparatively greater than that of graft polymerization of the co-curing agent with the rubber molecule main chain. In other words, before the melting of the microcapsules, crosslinking of the rubber molecule main chains proceeds by virtue of the organic peroxide as the crosslinking initiator, and accordingly, a crosslinking pattern advantageous in rebound performance can be realized, whereby rebound performance of the golf ball is improved.

The reaction of the co-curing agent with the rubber molecule is restricted to some extent by the film material of the microcapsule. Therefore, the number of the bonding points between the co-curing agent and the rubber molecule is reduced, so that a solid core that is soft and excellent in rebound performance can be obtained. Further, the size of the particles can be made uniform using the microcapsules, so that a solid core homogeneous in physical properties can be obtained.

Examples 10–12 and Comparative Example 3

(1) Manufacture of Microcapsule H 5 g of polystyrene (softening point: 100° C.) was dissolved into 50 ml of methylene chloride, to which a water solution of zinc methacrylic acid as a co-curing agent was added in an amount of 100 g (concentration: 20%). It was stirred for 30 minutes for emulsification, and a (W/O) type emulsion was obtained. Next, 1 liter of 4% PVA water solution was prepared, to which the (W/O) type emulsion above was added while stirring. As a result, a [(W/O)/W)] type complex emulsion was obtained. The system was gradually heated to 40° C. to vaporize the methylene chloride, followed by stirring at 55° C. for one hour to harden the film material, and thus, Microcapsule H was obtained. Zinc methacrylic acid is included 78 wt. % within the microcapsule.

(2) Manufacture of One-piece Golf Ball

The respective rubber composition shown in Table 3 below was kneaded with a kneader and roll, and subjected to hot pressing at 160° C. for 30 minutes. A golf ball of 42.7 mm in outside diameter and 45.5 gin weight was obtained. The temperature at the time of kneading was controlled such that the temperature of the rubber composition would not exceed 100° C. The finishing process was conducted by applying clear paint made of urethane on the surface of the golf ball.

TABLE 3

| Parts by weight | | | Example 10 | Example 11 | Example 12 | Comparative example 3 |
|---|---|---|---|---|---|---|
| Rubber composition | Polybutadiene | *1) | 100 | 100 | 100 | 100 |
| | Microcapsule H | *2) | 32.0 | 35.9 | 25.6 | — |
| | (in terms of zinc methacrylic acid) | | (25.0) | (28.0) | (20.0) | |
| | Zinc methacrylic acid | *3) | — | — | 5.0 | 25 |
| | Zinc oxide | *4) | 3 | 3 | 3 | 2.35 |
| | Dicumyl peroxide | *5) | 0.8 | 0.8 | 0.8 | 0.8 |
| | Titanium dioxide | *6) | 1.0 | 1.0 | 1.0 | 1.0 |
| | Calcium carbonate | *7) | 2.0 | 2.0 | 2.0 | 2.0 |
| Physical property | Amount of deformation by compression (nm) | | 2.78 | 2.65 | 2.70 | 2.62 |
| | Coefficient of restitution | | 0.725 | 0.729 | 0.723 | 0.720 |

The polymer components and ingredients in the respective rubber compositions shown in Table 3 are as follows.
*1) Polybutadiene, BR01, available from JSR Corporation, having a cis-1,4 bond content of 96%, was used.
*2) Microcapsule H manufactured as described above was used for the Examples.
*3) Zinc methacrylic acid, San-ester SK-30, available from Sanshin Chemical Industry Co., Ltd. was used.
*4) Zinc oxide available from Toho Zinc Co., Ltd. was used.
*5) Dicumyl peroxide, Percumyl D, available from NOF Corporation was used.
*6) Titanium dioxide, A-220, available from Ishihara Sangyo Kaisha, Ltd. was used.
*7) Calcium carbonate, Whiton BF-300, available from Bihoku Funka Kogyo Co., Ltd. was used.

The physical properties of the obtained golf balls were measured as described above.

It is appreciated from Table 3 that Examples 10–12 of the present invention are superior to Comparative example 3 in restitution coefficient, because Examples 10–12 each employ a rubber composition having a micro-encapsulated co-curing agent blended therein, whereas Comparative example 3 employs a rubber composition containing no microcapsules.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A golf ball including a vulcanized molded product of a rubber composition containing a co-curing agent and an organic sulfur compound micro-encapsulated within a thermoplastic resin.

2. The golf ball according to claim 1, wherein said organic sulfur compound is one of polysulfides, thiophenols, and bivalent metallic salts of the thiophenols.

3. The golf ball according to claim 1, wherein the golf ball includes a core formed from the rubber composition which is enclosed by a cover of a different composition.

4. The golf ball according to claim 1, wherein said co-curing agent includes at least one of an $\alpha,\beta$-unsaturated carboxylic acid and a metallic salt of the $\alpha,\beta$-unsaturated carboxylic acid.

5. The golf ball according to claim 4, wherein said vulcanized molded product is one of a one-piece golf ball or a solid core of a multilayer structured golf ball.

6. The golf ball according to claim 1, wherein a microcapsule containing the co-curing agent micro-encapsulated within the thermoplastic resin contains 70–95 wt. % of the co-curing agent.

7. The golf ball according to claim 5, wherein a microcapsule containing the co-curing agent micro-encapsulated within the thermoplastic resin contains 70–95 wt. % of the co-curing agent.

8. Golf ball according to claim 1, wherein said thermoplastic resin has a softening point in a range from 80° C. to 250° C.

9. Golf ball according to claim 1, wherein said thermoplastic resin has a softening point in a range from 120° C. to 160° C.

* * * * *